Figure 1:
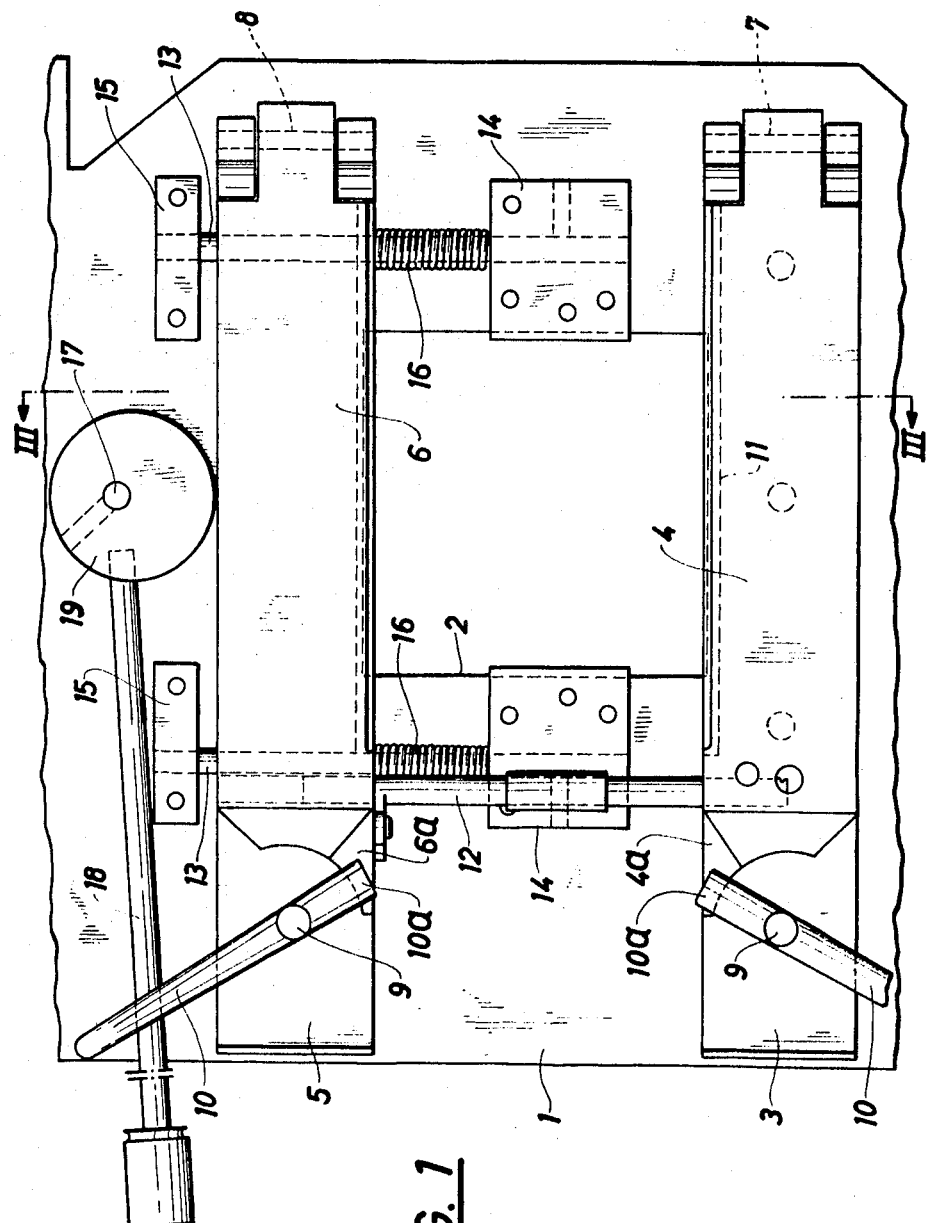

United States Patent

Uddgren

[15] 3,644,038
[45] Feb. 22, 1972

[54] FILM-HOLDING DEVICE
[72] Inventor: Gunnar Nils Uddgren, Vaxelmyntscatan, 41 D Goteborg, Sweden
[22] Filed: Aug. 26, 1969
[21] Appl. No.: 853,111

[52] U.S. Cl. ............................................................. 355/75
[51] Int. Cl. ...................................................... G03b 27/62
[58] Field of Search .............................. 355/74, 75; 95/100

[56] References Cited

UNITED STATES PATENTS

| 2,431,217 | 11/1947 | Waldorf | 355/75 |
| 2,889,759 | 6/1959 | Copenhefer | 95/100 |
| 2,959,096 | 11/1960 | Bobeck et al. | 355/75 |
| 2,968,216 | 1/1961 | Westendorp | 355/74 |
| 2,995,979 | 8/1961 | Gordon et al. | 355/75 |

*Primary Examiner*—Samuel S. Matthews
*Assistant Examiner*—Michael L. Gellner
*Attorney*—Linton & Linton

[57] ABSTRACT

A film-holding device having two pairs of pivotally connected jaws for gripping and stretching film held therebetween, has one pair of said jaws fixedly mounted on a plate while the other pair of jaws is slideably mounted on said plate for movement to and from said first pair of jaws through operation of a cam or springs and said jaw pairs are each on an opposite side of an opening in said plate over which the film is positioned.

3 Claims, 4 Drawing Figures

INVENTOR
GUNNAR NILS UDDGREN
BY Linton and Linton
ATTORNEYS

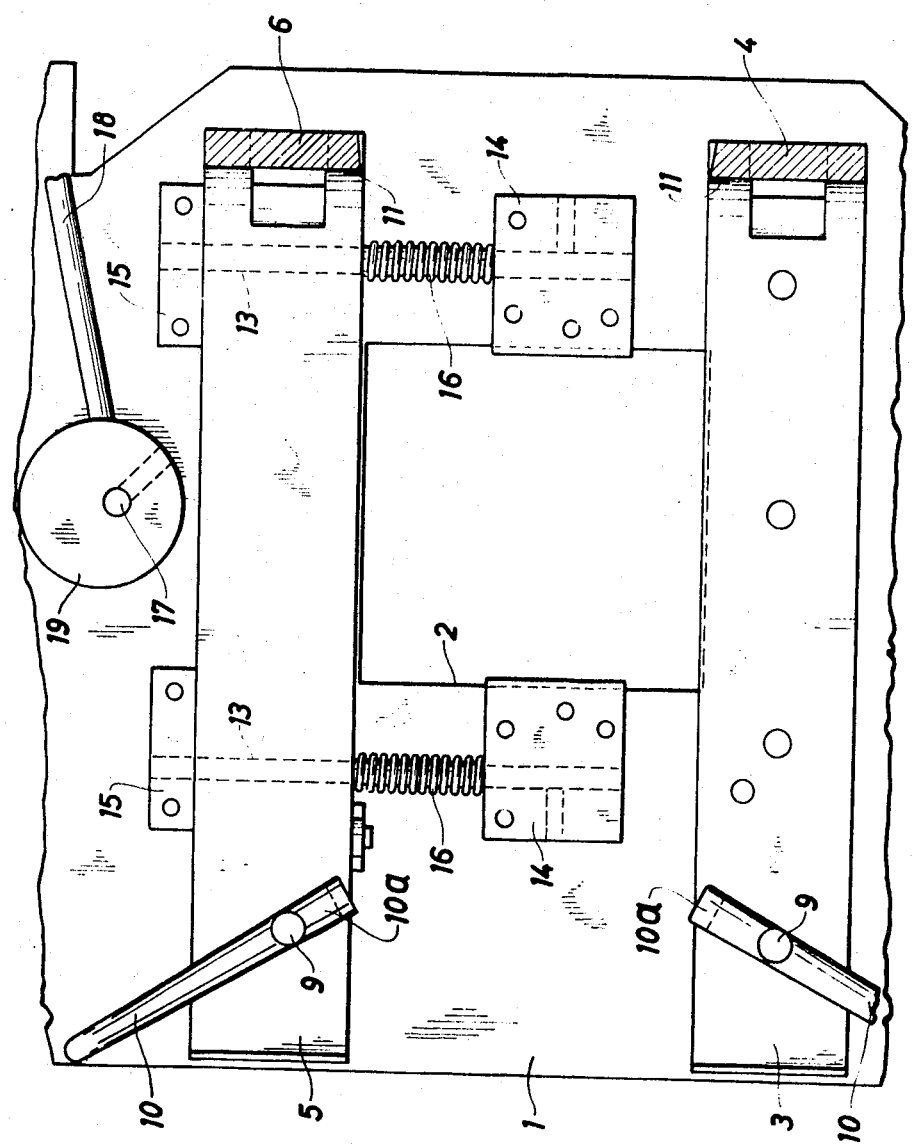

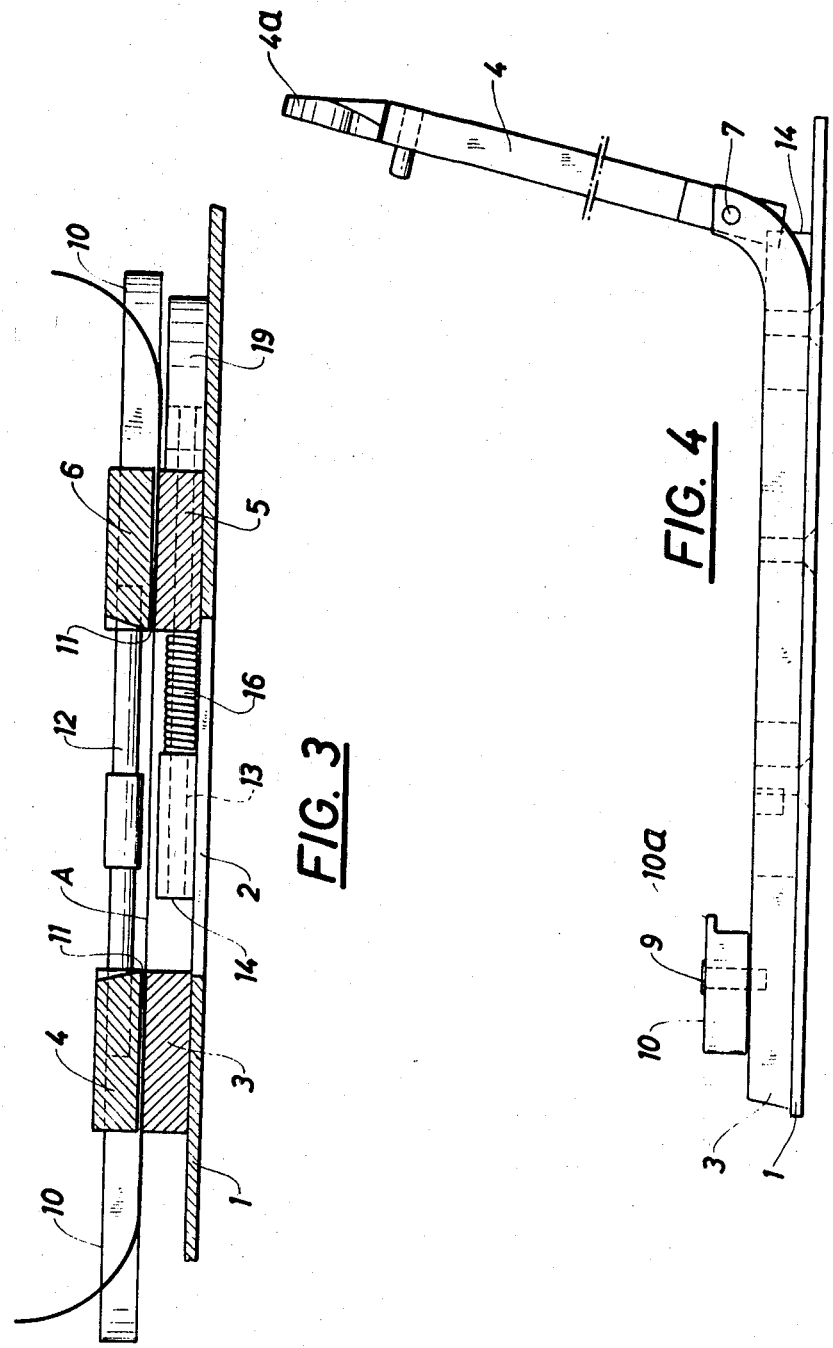

FILM-HOLDING DEVICE

In film-holding devices used in connection with photographic enlargement work and the like the film in the prior art is placed between two plates of glass, which have to be kept thoroughly clean. In case dust particles should adhere to anyone of the surfaces of the film or to the inside surfaces of the glass plates, it is necessary to open up the film-holding device and take out the film.

It is a purpose of the present invention to avoid the difficulties connected with earlier known designs of film-holding devices by providing a film-holding device, in which the film is kept absolutely plane without the help of glass plates, so that the film can be cleansed of dust particles without having to open up the holder.

The film-holding device according to the invention is substantially characterized by a plate provided with an opening with each pair of two pairs of jaws being arranged close to one side of opposite edges of said opening to keep the film in place, one pair of said jaws being slideably carried by the plate and parallelly displaceable towards and away from the other pair of said jaws.

According to the invention the movable pair of jaws is suitably displaceable towards the other pair of jaws against the bias of a spring.

According to one embodiment of the invention an eccentric pivotably carried by the plate and contacting the movable pair of jaws from the side positioned away on their other pair of jaws is arranged for the displacement of the movable pair of jaws against the bias of the spring mentioned above.

The invention will now be described more in detail below with reference to the accompanying drawings, in which:

FIG. 1 is a partial top view of a film-holding device according to the invention in its closed position, FIG. 2 is a corresponding view of the holding device in its opened position, FIG. 3 is a cross-sectional view of the holding device in FIG. 1 taken along the line III—III and FIG. 4 is a partly exploded view of the holding device in opened position.

The film or negative holding device illustrated in the drawing comprises a plate 1 introduceable into a film enlarging apparatus and having a rectangular opening 2 for the negative. In order to hold the negative in position in front of the opening 2, two pairs of jaws 3,4,5, and 6 are arranged on one side of the plate 1 close to opposite edges of the opening. The jaw 3 is fixed to the plate 1, while the jaw 5 is slideably carried by the plate and displaceable in a direction towards and away from the jaw 3 in a manner, which will be described more in detail hereinafter. The jaw 4 is pivotally carried by the jaw 3 around an axis 7, and the jaw 6 is by means of an axis 8 pivotably mounted at the corresponding end of the jaw 5, which is displaceably carried by the plate. At the ends of the jaws 3 and 5, opposite to said pivoting axis, two locking arms 10 are pivotally mounted on the pivot pins 9, which are perpendicular to the plane of the plate. The end portions of said locking arms indicated with 10a being intended to be pivoted in over a bevelled end portion 4a and 6 a respectively of the jaws 4 and 6, when said jaws 4 and 6 are in their folded position against the jaws 3 and 5. The end portions 10a of said locking arms by wedge action pressing the pivotable jaws against the jaws 3 and 5 for holding a negative in place, which negative is inserted between the jaws in centric position in front of the opening 2 of the plate 1. The pivotable jaws 4 and 6 at the side turned towards the jaws 3 and 5 close to the edge most adjacent to the opening 2 are provided with a thin lip 11 made of rubber or other resilient material, which lip serves the purpose of making close contact with the negative or film band. The two pivotable jaws 4 and 6 are further near their free ends connected together by means of a crosspiece 12, by means of which both the jaws can be pivoted together.

The jaw 5 in a direction towards and away from the jaw 3, which is fixed to the plate, is displaceably guided by means of two bars indicated with 13, which bars each extend through a bore through the jaw 5 crosswise and parallel to the plate, and the end portions of which bars are anchored on blocks 14 and 14 fixed to the plate 1. Two compression springs 16, which are mounted each one around its bar 13 between the block 14 and the jaw 5 tend to maintain the jaw in close contact with the blocks 15. At the plate 1 a cam 19, which is pivotable by means of a lever 18, is mounted around a pivot pin 17, which is perpendicularly located to the plane of the plate 1 on the side of the opening, which is opposite the pair of jaws 5,6. The cam 19 is arranged so that upon being turned counterclockwise from the position illustrated in FIG. 2 its peripherical surface will contact the side of the jaw 5, which is turned away from the opening 2, in order to displace the jaw 5 together with the jaw 6, which is pivotable at said jaw 5, in a direction to the opposite pair of jaws 3,4 against the bias of the springs 16. In FIG. 1 the pair of jaws 5,6 is shown in a position, which is displaced by means of the cam 19 against the bias of the springs 16. In order to retain the pair of jaws in that position, the lever 18 is arranged to arrive at a stop against the one of the two blocks 15, which is located to the left in FIG. 1, after said lever has passed the dead point position of the cam.

In order to insert a negative in the holding device described above, the two jaws 4 and 6 are pivoted upwards from the plate 1, and the cam 19 is pivoted by means of the lever 18 to the position illustrated in FIG. 1, in which the pair of jaws 5,6 is somewhat displaced in a direction towards the pair of jaws 3,4 compared to the position illustrated in FIG. 2.

The negative is placed in front of the opening 2 with two edge portions of the negative laying on the jaws 3 and 5, whereafter the jaws 4 and 6 are pivoted downwards and by means of the locking arms 10 are clamped with the lips 11 pressed onto the edge portions of the negative. The arrangement according to the embodiment illustrated in the drawing makes it possible also to insert an uncut film band, as is evident from FIG. 3, where a film band A is shown in its inserted position between the jaws. After the negative or film band, has been inserted between the jaws in the manner described above the cam is pivoted clockwise from the position illustrated in FIG. 1, so that the springs 16 tend to return the pair of jaws 5,6 to the position illustrated in FIG. 2, by means of which an efficient stretch of the negative and film band respectively clamped between the pairs of jaws will be obtained. In order to remove the negative or the film band from the holding device, the cam is once again pivoted to the position illustrated in FIG. 1, the locking arms 10 are pivoted out of engagement with the jaws 4 and 6 whereafter the end portions 4a and 6a respectively and the jaws 4 and 6 are pivoted upwards to the position illustrated in FIG. 4.

The stretch of the negative or portion of film band located in position in front of the opening 2 in the plate 1, provided by the holding device according to the invention causes the film to be kept in an absolutely plane position at the same time as both sides of the film are accessible for the removal of dust particles.

The invention is not limited to the embodiment described only by way of example above and illustrated in the drawings, which embodiment can be changed as to its details without departing from the idea of the invention.

I claim:

1. A film-holding device comprising a plate having an opening, first and second pairs of jaws for holding film therebetween and having each pair thereof pivotally connected at one end, one jaw of said first pair being fixedly mounted on said plate alongside one edge of said plate opening, means mounted on said plate slideably supporting one jaw of said second pair for movement to and from said fixed jaw over an opposite edge of said plate opening, clamping means carried by said fixed jaw and said slideable jaw and each clamping means capable of clamping down the nonpivoted end of the other jaw of said first and second pairs with the jaws of each pair being superimposed detachably retaining the film therebetween, and resilient means tending to retain said slideable jaw away from said fixed jaw.

2. A film-holding device as claimed in claim 1 including a cam pivotally mounted on said plate and capable when pivoted of contacting said slideable jaw and moving said slideable jaw towards said fixed jaw.

3. A film-holding device as claimed in claim 1 wherein said first and second pairs of jaws have opposing flat faces for receiving the film therebetween.

* * * * *